United States Patent

Monti

[15] 3,676,901

[45] July 18, 1972

[54] ADJUSTABLE, QUICKLY RELEASABLE WEBBING CONNECTOR

[72] Inventor: Renzo J. Monti, Blackstone, Mass.

[73] Assignee: The United States of America as represented by the Secretary of the Army

[22] Filed: Dec. 14, 1970

[21] Appl. No.: 97,646

[52] U.S. Cl. .................................. 24/191, 24/74, 24/170, 297/385

[51] Int. Cl. ............... A44b 11/12, A44b 11/00, B68b 5/00

[58] Field of Search ...................... 24/74, 191, 170; 297/385

[56] References Cited

UNITED STATES PATENTS 397,713  10/1888  Hohenstein ...................... 24/170 UX
1,323,933  12/1919  Troop ................................ 24/74 R
2,148,585  2/1939  Schlesinger ....................... 24/170 X
2,869,200  1/1959  Phillips et al. ...................... 24/170 X

FOREIGN PATENTS OR APPLICATIONS 23,793  8/1906  Great Britain ....................... 24/74 R

*Primary Examiner*—Paul R. Gilliam
*Attorney*—Harry M. Saragovitz, Edward J. Kelly, Herbert Bell and Charles C. Rainey

[57] ABSTRACT

An adjustable, quickly releasable webbing connector having non-slip characteristics which make it particularly useful with webbing made of relatively slippery fibrous materials.

2 Claims, 4 Drawing Figures

Patented July 18, 1972
3,676,901
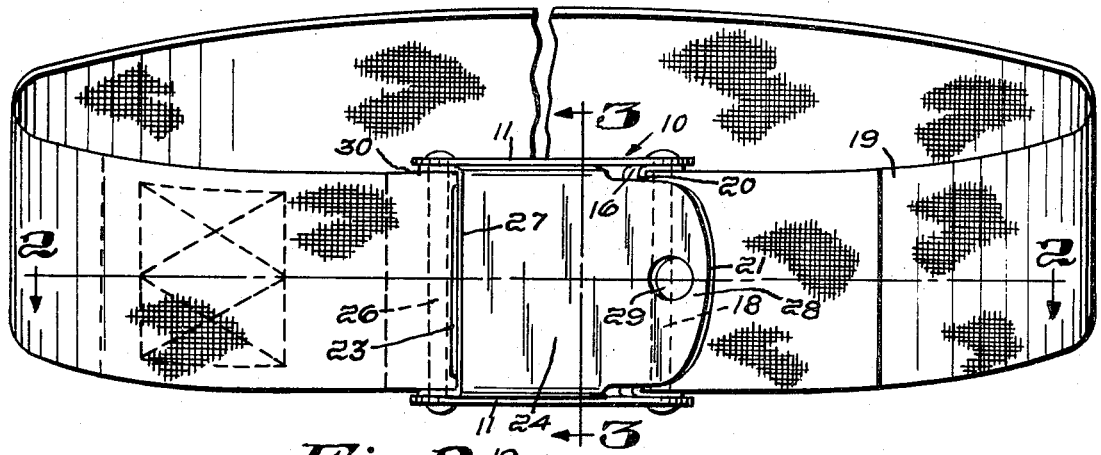
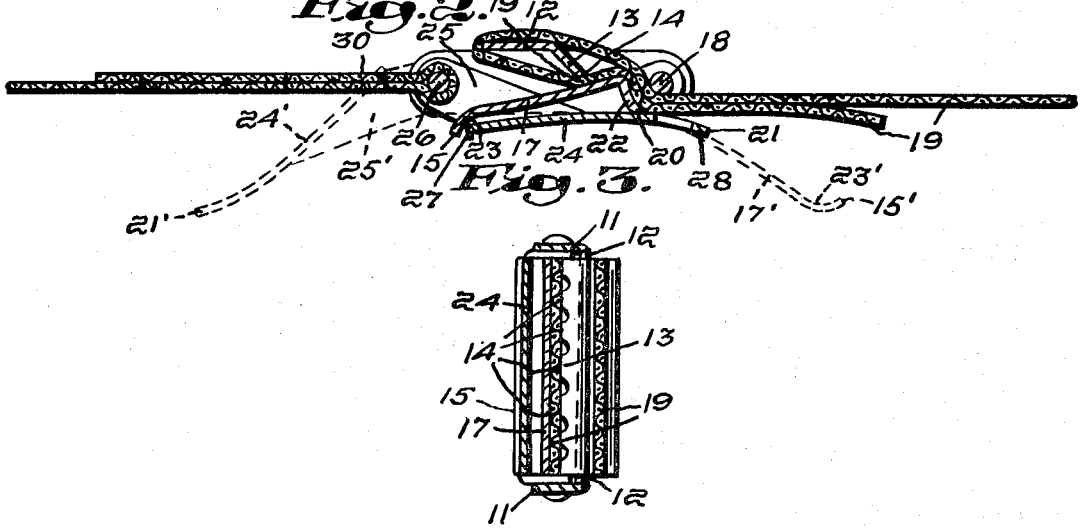
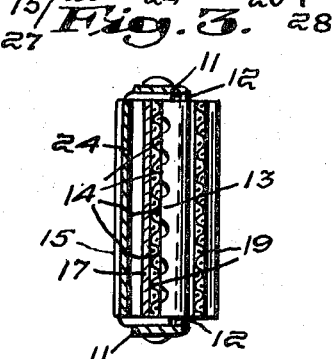
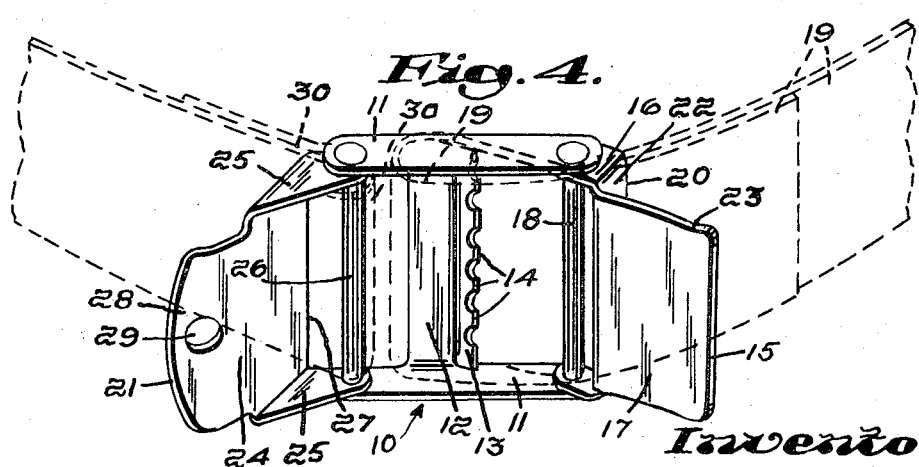
Inventor:
Renzo J. Monti,
by: Harry M. Saragovitz, Edward J. Kelly,
Herbert Berl & Charles C. Rainey
Attorneys

ADJUSTABLE, QUICKLY RELEASABLE WEBBING CONNECTOR

The invention described herein may be manufactured, used, and licensed by or for the Government for governmental purposes without the payment to me of any royalty thereon.

This invention relates to an adjustable, quickly releasable webbing connector for use in connecting various types and sizes of webbing in substantially non-slipping relation.

In the military equipage art, it is especially important that the connectors for webbing used for releasably attaching various types of load-bearing equipment to the body, or for releasably holding various types of containers closed, be substantially slip-proof, yet quickly releasable when it becomes desirable to disconnect or adjust the overall length of the webbing. Many of the webbing connectors used in the past have either been adjustable or releasable only with considerable difficulty or have not been relatively slip-proof, especially with webbing made of fibers, such as nylon, which tend to slip very easily over most types of surfaces.

It is, therefore, an object of the invention to provide an adjustable, quickly releasable connector for webbing.

It is also an object of the invention to provide an adjustable, quickly releasable webbing connector which is substantially slip-proof when the latch portion thereof is in the locked position.

Other objects and advantages will be apparent from the following description of the invention, and the novel features will be particularly pointed out hereinafter in connection with the appended claims.

In the accompanying drawings:

FIG. 1 is a top plan view of the webbing connector of the invention in its locked state with webbing attached thereto at one end and another length of webbing connected thereto by means of the webbing connector elements.

FIG. 2 is a longitudinal sectional view of the webbing connector and webbing along the line 2—2 of FIG. 1. The latch means and tongue means are shown also in broken lines and with primed reference numerals showing their relationships when the webbing connector is unlatched and substantially open.

FIG. 3 is a cross sectional view of the webbing connector along the line 3—3 of FIG. 1.

FIG. 4 is a perspective view of the webbing connector in the open state, the webbing being shown in phantom in order not to interfere with the viewing of the parts of the webbing connector. The latch means and tongue means are shown in substantially the same relationships as shown by the broken lines and primed reference numerals in FIG. 2.

In the embodiment of the webbing connector of the invention illustrated in the drawings, a body 10 of the webbing connector has opposed, substantially parallel, elongated, upstanding sides 11 which are joined adjacent to their lower edges by a cross bar 12 located intermediately lengthwise of the sides. The cross bar has an upwardly extending portion 13 which extends at an acute angle with respect to the lower edges of the sides 11 into the space therebetween. The cross bar is provided with a gripping edge 14 which extends transversely of the sides 11 and is preferably serrated to impart better gripping characteristics thereto.

A tongue means 15 comprising a yoke portion 16 and a tongue portion 17 is pivotally mounted between the sides of the body of the webbing connector on cylindrically shaped bar 18, which extends between the sides of the body at one end thereof. The tongue portion extends from one side of the yoke portion so that when the yoke portion is pivoted toward the gripping edge of the cross bar, the tongue portion is brought over and into close proximity to the gripping edge to grip webbing 19 lying against the gripping edge between the gripping edge and the tongue portion. The other side 20 of the yoke portion serves as a stop for a latch means 21, to be more particularly described hereinafter. The tongue portion 17 defines an angle of about 90° with the top 22 of the yoke portion and has an upwardly curved biasing portion 23 on the free end thereof for a purpose to be described hereinafter.

The latch means 21 comprises a body portion 24 having flange portions 25 along both side edges thereof. Flange portions 25 are substantially parallel to sides 11 and are pivotally mounted on cylindrically shaped bar 26, which extends between the sides 11 of the body of the webbing connector at the opposite end thereof from bar 18 on which tongue means 15 is mounted. Thus the latch means 21 is pivotable toward as well as away from the tongue means 15 and the former is carried out during the latching operation after the tongue means has been pivoted toward the latch means to engage webbing 19 lying against the gripping edge of the cross bar. To complete the latching operation, the latch means is pressed firmly against the tongue means until the upwardly curved biasing portion 23 of the tongue means snaps over the rear edge 27 of the latch which is located so that an obtuse angle is formed between a plane passing through the body portion 24 of latch means 21 and a plane in which the rear edge 27 of the latch means and the axis of bar 26 lie in substantially parallel relation. As the curved biasing portion 23 of the tongue means snaps over the rear edge 27 of the latch means, the tongue portion 17 of the tongue means becomes slightly flexed forming a leaf spring which through the curved biasing portion 23 applies a bias in a forward direction to the latch means sufficient to maintain the webbing connector latched and the webbing tightly clamped between the gripping edge and the tongue portion until such time as the bias is overcome by the deliberate application of an unlatching force to the latch means. The free end 28 of the latch means, which is preferably curved upwardly to provide for easy unlatching thereof, is stopped by side 20 of the yoke portion 16 at substantially the same time as the biasing portion of the tongue means snaps over the rear edge of the latch means.

When it is decided to release the webbing, the upwardly curved free end 28 of the latch means is grasped by means of a thumb or finger and lifted by applying sufficient force to the latch means to overcome the biasing force of the biasing portion 23 on the latch means. When this is accomplished, the rear edge of the latch means snaps over or past the biasing portion 23 of the tongue means, thus relaxing the pressure of the tongue portion on the webbing. The webbing thereupon becomes free to slip between tongue portion 17 and gripping edge 14. If desirable to facilitate the release of the webbing connector, a hole 29 may be formed in the free end of the latch means and a thong (not shown) threaded therethrough so that a gloved hand may be used in unlatching the webbing connector by pulling on the thong.

The cylindrically shaped bar 26 may be used for attachment of the webbing connector to a webbing loop 30 or other anchorage for the webbing connector.

While the invention has been described in terms of its use as a webbing connector, it is to be understood that it is not limited to use with webbings since other flexible, compressible and resilient materials may also be clamped or gripped by the above-described type of connector. For example, the invention may be used with films or strips of fabric, provided they are sufficiently thick, flexible, compressible and resilient to be tightly gripped between gripping edge 14 and tongue portion 17 when introduced therebetween and latch means 21 is latched in place as described above.

The present invention provides an adjustable, quickly releasable webbing connector which is particularly useful with webbings made of nylon or other filaments or fibers which tend to slip easily in the clamping devices of the prior art. The webbing connector of the invention is substantially slip-proof even when used with nylon webbings. It may be used with a wide variety of equipment requiring adjustable and quickly releasable fastenings or connectors and is especially useful with military type equipage, snowshoe bindings, satchel type tool bags, containers of many and varied types, as well as for any situation where two ends of a webbing, strap, or belt are required to be connected together, but to be easily and quickly releasable.

It will be understood, of course, that various changes in the details, materials and arrangements of parts which have been herein described and illustrated in order to explain the nature of the invention, may be made by those skilled in the art within the principle and scope of the invention.

I claim:

1. An adjustable, quickly releasable webbing connector comprising a body having opposed substantially parallel, elongated, upstanding sides joined adjacent to their lower edges by a cross bar located intermediately lengthwise of said sides, said cross bar having a portion thereof extending upwardly at an acute angle with respect to the lower edges of said sides into the space between said sides to form a gripping edge extending transversely of said sides, tongue means pivotally mounted between said sides adjacent to the end thereof toward which said gripping edge faces, said tongue means comprising a yoke portion pivotally mounted between said sides and a tongue portion extending from one side of said yoke portion, said tongue portion being conformed to pass over said gripping edge in close proximity thereto when said tongue means is in a closed position and having an upwardly curved biasing portion on the free end thereof, and latch means comprising a body portion having flange portions along both side edges thereof, said flange portions being substantially parallel to said sides of said webbing connector body, said latch means being pivotally mounted between said sides of said webbing connector body adjacent to the other end thereof on a cylindrically shaped bar mounted between said sides of said webbing connector body for movement over said tongue means, said cylindrically shaped bar comprising means for attachment of said webbing connector to a loop of webbing, said latch means being conformed to engage the free end of said tongue means to move said tongue means into clamping engagement with a portion of webbing lying over said gripping edge, the rear edge of said latch means being substantially parallel to the pivot axis on which said latch means is pivotally mounted, said rear edge and said pivot axis lying in a plane forming an obtuse angle with the plane of said latch means, said latch means being maintained in its closed position by said upwardly curved portion of said tongue means applying a biasing force through said upwardly curved biasing portion thereof to said rear edge of said latch means, said free end of said latch means resting against the other side of said yoke portion of said tongue means when said tongue means and said latch means are in closed positions, said latch means being quickly releasable by lifting the free end thereof to overcome the biasing force exerted by said upwardly curved portion of said tongue means on said rear edge of said latch means, whereby said tongue means is released from its clamping engagement with said portion of webbing lying over said gripping edge.

2. An adjustable, quickly releasable webbing connector as in claim 1, wherein said gripping edge is serrated.

* * * * *